United States Patent [19]

Maier et al.

[11] 4,422,239

[45] Dec. 27, 1983

[54] POWERED HANDTOOL

[76] Inventors: Peter Maier, Gerokstr. 1, 7311 Neidlingen/Teck; Hans-Dieter Tschacher, Hohenzollernstr. 4, 7313 Reichenbach, both of Fed. Rep. of Germany

[21] Appl. No.: 307,457

[22] Filed: Oct. 1, 1981

[30] Foreign Application Priority Data

Oct. 11, 1980 [DE] Fed. Rep. of Germany ....... 3038489

[51] Int. Cl.³ .............................................. B26B 25/00
[52] U.S. Cl. ......................................... 30/124; 51/273
[58] Field of Search ............... 30/133, 124; 51/170 R, 51/170 PT, 273; 83/168

[56] References Cited

U.S. PATENT DOCUMENTS 3,126,021  3/1964  May ................................... 51/273 X
4,102,083  7/1978  Stern .................................. 51/170 R
4,281,457  8/1981  Walton ................................. 30/124

Primary Examiner—Jimmy C. Peters
Attorney, Agent, or Firm—Flynn, Thiel, Boutell & Tanis

[57] ABSTRACT

A powered hand tool, as for example an angle grinder or a milling tool for use with a routing cutter for working on wood or synthetic resin, has a housing, a motor, and a cover for the tool bit. In the housing an airway is placed for aspiration of air from the space within the cover, the airway coming to an end at an opposite end of the housing.

5 Claims, 6 Drawing Figures

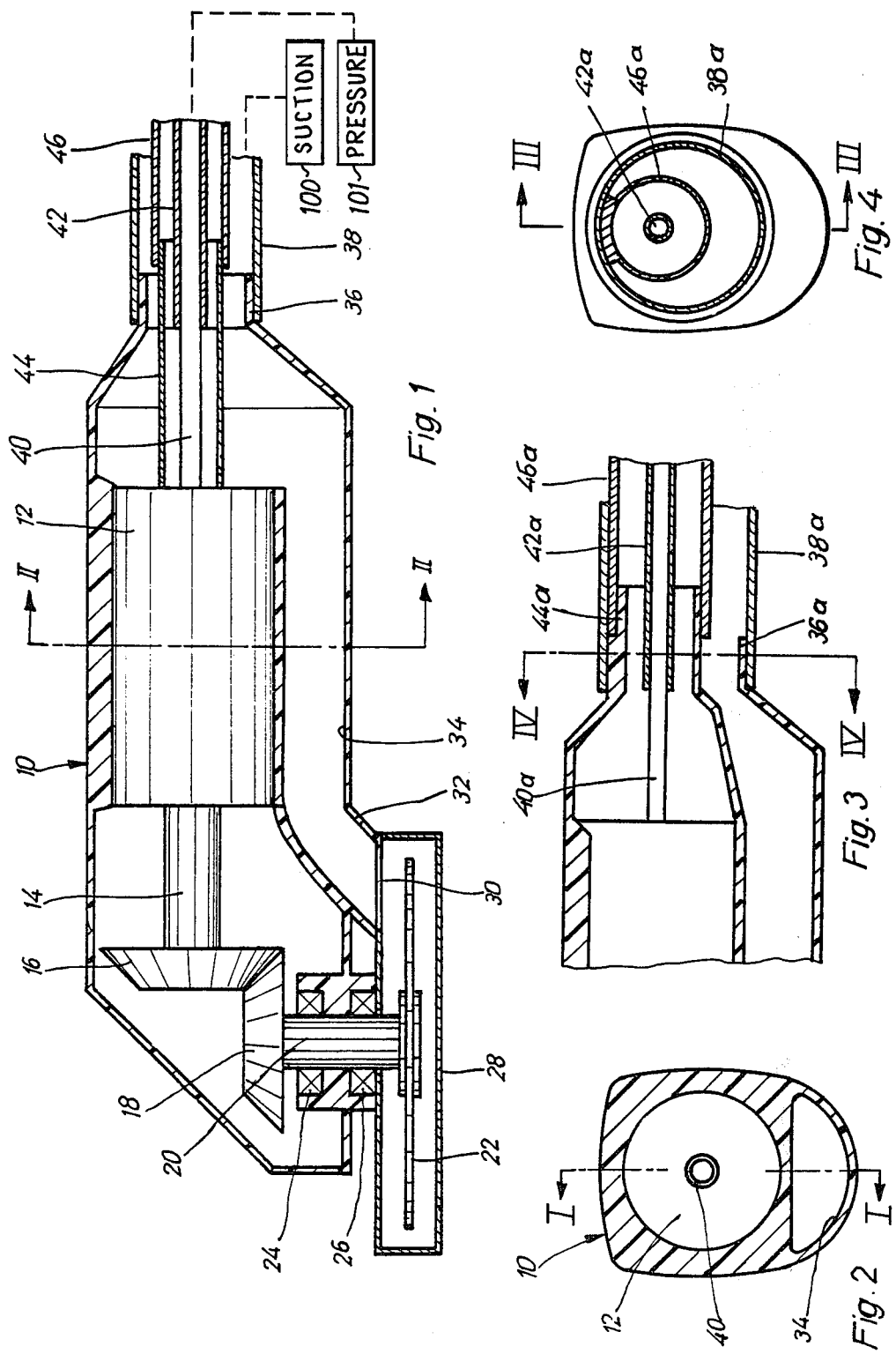

POWERED HANDTOOL

FIELD OF THE INVENTION

The present invention relates to a power hand tool as for example an angle grinder, a router or a miller, for use on synthetic resin or wood.

BACKGROUND OF THE INVENTION

A number of different forms of such power tools are in existence. On working with such hand power tools, much dust and shavings are produced as the workpiece is cut. This is not only troublesome for the user but furthermore makes it harder for the work to be cut to the true desired size, because the point of working may not be seen. Although attempts have been made in the prior art at designing hand power tools in which a remote suction source is joined up by way of a pipe connection with the tool cover for the aspiration of dust and shavings, the flexible aspiration pipe coming from the cover is likely to get in the way when using the power tool.

SHORT OUTLINE OF THE INVENTION

One purpose of the present invention is that of designing a hand power tool of the sort noted in the case of which, while making it possible for dust and shavings to be cleared from the tool part cover does not make it any harder for the tool to be used than is the case with hand power tools without any aspiration system.

SUMMARY OF THE INVENTION

For effecting this and further purposes an aspiration airway is placed in the housing, the airway being joined up with a space inside the cover and with an end of the housing furthest from the tool part.

In the hand power tool of the present invention the aspiration airway is designed running from the cover into and through the housing so that there are no flexible pipes joined up with the cover. In fact, the aspiration system is joined up with the end of the housing furthest from the tool, at which position there is as a rule an electrical or compressed air power line coming from the housing and used for driving the motor of the power hand tool. For this reason such a power hand tool may generally be said to be simple in use.

As part of one further development the hand power tool has at the end of the housing furthest from the tool part a pipe connection for joining up with an aspiration pipe, and a further connection for the power line of the driving motor, the two connections being right next to each other. With such a form of the invention it is possible for the aspiration pipe and the power line for the driving motor to be fixed in position with only one motion of the hand.

It is furthermore possible for the aspiration pipe connection to be placed round the motor's power line connection, this giving a useful effect, inasfar as there will be only one coaxial pipe joined up with the power tool so that the power tool may be very much more readily used.

It is furthermore possible for the aspiration pipe connection and the motor power line connection to be placed in an end wall of the housing furthest from the tool part, this making it possible for the tool to be readily and safely gripped in the hand; a further useful effect produced in this connection being simpler cleaning of the power tool.

It is furthermore possible for the outer face of the wall of the aspiration airway to be generally semi-cylindrical, this making it possible for aspiration to take place without any trouble even after changing over from one form of cover to an other one as may be used with different tool parts.

As part of a further development of the invention the inlet end of the aspiration airway is joined up with the cover by way of a gasket so that it may be undone therefrom, this offering a useful effect inasfar as the power hand tool may be used for a greater number of different purposes as for example with different coveres, even very small covers as used for small milling or routing cutters, it then being possible for such small cutters to have their own connections running as far as the said connection for the aspiration pipe.

BRIEF DESCRIPTION OF THE DRAWINGS

An account will now be given of the invention using different working examples to be seen in the figures.

FIG. 1 is a lengthwise section through an angle grinder with an aspiration airway within the housing and walled in thereby, taken along the section line I—I of FIG. 2.

FIG. 2 is a section through and across the angle grinder of FIG. 1 taken along the section line II—II of FIG. 1.

FIG. 3 is a fragmentary lengthwise section view of a further angle grinder embodying the invention, taken along line III—III of FIG. 4.

FIG. 4 is a sectional view of the angle grinder of FIG. 3 taken along line IV—IV in FIG. 3.

DETAILED DESCRIPTION

The angle grinder to be seen in the figures and more specially FIG. 1 has a housing 10 in which a driving motor, as for example a compressed air motor 12, is placed for driving by way of its motor shaft 14 and two bevel gearwheels 16 and 18 a tool arbor 20, on which a cut-off wheel or tool 22 is fixed, arbor 20 running in bearings 24, 26.

On the part of the housing supporting bearings 24, 26 a cover 28 is fixed using screws (not to be seen in the figure) the cover running round the greater part of the outer edge of cut-off wheel 22. The side or top wall of cover 28 has an opening 30 communicating with a connection channel 32 of housing 10 air-tightly without the use of any special fixing part, although an elastic gasket may be placed between the housing and the cover if desired.

Connection channel 32 is joined up with an aspiration airway 34 formed in housing 10. The other end of aspiration airway, duct, or conduit 34 is joined up with an end part (to be seen on the right in FIG. 1) of housing 10 and may be joined up, by way of a pipe connection 36 provided on or in the end housing wall to be seen on the right in FIG. 1, up with a flexible aspiration pipe 38 which is joined with a conventional aspiration and air cleaning unit 100.

Pipe connection 36 is placed so as to be coaxial with the connection 40 which is joined up with the inlet opening of the driving motor, such driving motor being in the present case a compressed air motor 12, although other forms of motors would be possible. On connection 40 it is furthermore possible to have a power line, as for example a compressed air line 42 in the case of the use of a compressed air motor, such power line being put in position at the same time as putting on the aspiration air pipe 38, which is placed coaxially round it. The compressed air line 42 is connected to a conventional compressed air source 101. On the other hand, if the motor were an electric motor, an electric power line would be necessary. Quick release couplings for airtightly joining up the aspiration pipe and the compressed air line 42 with the pipe connection 46 and a further connection 40 are on the market and no detailed account thereof is necessary here. In the present case of a compressed air motor there is furthermore an outlet air connection 44 and a flexible pipe 46 joined therewith for outlet of air after the same has made its way through the motor. This air outlet system is furthermore made part of the housing.

It is only natural that in fact the housing 10 will be made up of a number of different parts so that it may be more simple produced. For example, the housing may have, starting from the left hand end in FIG. 1, a housing part stretching as far as the end face of the motor to be seen on the left, a further housing part stretching as far as the right hand end of the motor and a third part of the housing joined therewith.

It is furthermore possible for a single piece aspiration airway 34 to be used as is the case with some designs of powered hand tools in which the tool part or bit is turned by the motor shaft 14 itself, that is to say in the case of a straight power tool. In this case the part of the housing which is to the left in FIG. 1 is differently designed and will have a somewhat different form of connection for joining up with an opening in the tool part cover which in this case will be turned 90° in relation to the cover to be seen in FIG. 1.

As will be seen in FIG. 2, housing 10 has a form of cross-section designed for being readily gripped in the hand supporting the power tool. The outer limiting wall of the aspiration airway 34 has a cross-section in the form of half a circle running down from the rest of the housing, which is generally rectangular in cross-section.

In the working example of FIGS. 3 and 4, 46a is the air outlet flexible pipe for outlet of air from the compressed air driving motor, while the compressed air power line for the compressed air driving motor is marked 42a and is joined onto the connection 40a. The dust aspiration pipe is marked 38a and is put on connection 36a.

Common to all the working examples so far noted there is the measure that the unit is in the form of a handle having the driving motor and an aspiration airway within it, this being responsible for the useful effect that all connections (flexible pipes and cables) for input of air etc. to the hand tool, and for the output of air therefrom are placed at one point and may be fixed one inside the other so that the hand power tool is more readily used.

The embodiments of the invention in which an exclusive property or privilege is claimed are defined as follows:

1. In a hand tool which includes a housing having a handle part which can be manually gripped, a tool rotatably supported on said housing, a motor provided in said housing, means for releasably drivingly connecting said motor to said tool, a protective hood which is supported on said housing and partially surrounds said tool, means defining a suction channel which communicates with said protective hood and with a connecting piece which is provided on said housing at a location remote from said tool, and a suction device having a hose which leads to and is releasably secured to said connecting piece and communicates with said suction channel, said handle part being elongate and said suction channel extending appropriately parallel to said handle part, the improvement comprising wherein said motor is provided in said handle part of said housing and, viewing said handle part in cross section, is arranged eccentrically in said handle part, and wherein said suction channel is provided within said handle part and extends past said motor on one side thereof.

2. The hand tool according to claim 1, wherein said suction channel is integrated into said handle part, said suction channel being provided in a portion of said handle part which has a generally semicircular cross-sectional shape and an outer surface which merges smoothly into the outer surface of the remaining portion of said handle part, said remaining portion having a substantially rectangular cross-sectional shape with rounded corners.

3. The hand tool according to claim 1, wherein said handle part which contains said suction channel is releasably sealingly connected to said protective hood.

4. The hand tool according to claim 1, wherein said handle part of said housing extends at substantially a right angle with respect to the axis of rotation of said tool, and wherein said suction channel has at its end which communicates with said protective hood a section which is inclined with respect to the remainder of said suction channel.

5. The hand tool according to claim 1, wherein said motor is a pneumatic motor, including means defining a pressure source, and including means defining a supply conduit for carrying pressurized air from said pressure source to said motor and an outlet conduit for carrying waste air away from said motor, said outlet conduit including a first portion extending from said motor to said connecting piece through said suction channel and a second portion extending away from said connecting piece within said hose, and wherein said supply conduit is disposed within said outlet conduit.

* * * * *